United States Patent [19]
Kojima

[11] Patent Number: 5,704,598
[45] Date of Patent: Jan. 6, 1998

[54] VIBRATION ISOLATING APPARATUS

[75] Inventor: Hiroshi Kojima, Yokohama, Japan

[73] Assignee: Bridgestone Corporation, Tokyo, Japan

[21] Appl. No.: 711,203

[22] Filed: Sep. 9, 1996

[30] Foreign Application Priority Data

Sep. 12, 1995 [JP] Japan ............................ 7-233984
Aug. 8, 1996 [JP] Japan ............................ 8-210226

[51] Int. Cl.⁶ .................................................. F16H 13/14
[52] U.S. Cl. ........................................ 267/140.13; 267/219
[58] Field of Search .......................... 267/140.13, 141.1, 267/141.7, 219; 248/636, 638

[56] References Cited

U.S. PATENT DOCUMENTS

| | | | |
|---|---|---|---|
| 4,721,292 | 1/1988 | Saito | 267/140.13 |
| 4,756,515 | 7/1988 | Kuvoda et al. | 267/140.13 |
| 5,102,105 | 4/1992 | Hamaekers et al. | 267/140.13 |
| 5,178,374 | 1/1993 | Maeuo | 267/219 |
| 5,190,269 | 3/1993 | Ikeda et al. | 267/219 |
| 5,263,693 | 11/1993 | Klein | 267/140.13 |
| 5,295,672 | 3/1994 | Gugsch | 267/140.13 |
| 5,407,169 | 4/1995 | Tournier | 267/140.13 |
| 5,499,799 | 3/1996 | Kojima | 267/140.13 |

FOREIGN PATENT DOCUMENTS

| | | | |
|---|---|---|---|
| 1055429 | 3/1986 | Japan | 267/140.13 |
| 7-158687 | 6/1995 | Japan | |
| 7-293627 | 11/1995 | Japan | |
| 8-93838 | 4/1996 | Japan | |
| 8-100832 | 4/1996 | Japan | |

*Primary Examiner*—Robert J. Obebleitner
*Assistant Examiner*—Chris Schwartz
*Attorney, Agent, or Firm*—Oliff & Berridge, P.L.C.

[57] ABSTRACT

A vibration isolating apparatus includes: a mounting member connected to one of a vibration generating portion and a vibration receiving portion; an elastic body which is elastically deformable and connected to the mounting member; a bracket which is formed from resin, connected to the other of the vibration generating portion and the vibration receiving portion, connected to the elastic body, and together with the elastic body forms a concave space portion; a fluid chamber which is disposed within the space portion and into which fluid is filled; a caulking metal disposed such that a portion of the caulking metal is embedded in the bracket and a portion of one end side of the caulking metal projects at an open end of the space portion; and a cover member attached to the bracket and covering the fluid chamber so as to close the open end of the space portion, by the portion of the one end side of the caulking metal being bent and caulked. Because a portion of the caulking metal is embedded in the bracket, the caulking metal and the bracket are joined strongly. Accordingly, the cover member is fixed strongly to the bracket.

16 Claims, 9 Drawing Sheets

– 1 –

VIBRATION ISOLATING APPARATUS

BACKGROUND OF THE INVENTION

1. Field of the Invention

The present invention relates to a vibration isolating apparatus which prevents transmission of vibrations from a vibration generating portion, and which can be applied to mounts for supporting a member generating vibrations in an automobile, construction equipment, general industrial equipment, or the like.

2. Description of the Related Art

A vibration isolating apparatus serving as an engine mount is disposed between, for example, an engine, which is a vibration generating portion of a vehicle, and a vehicle body, which is a vibration receiving portion. The vibration isolating apparatus absorbs vibrations generated by the engine, and inhibits the transmission of the vibrations to the vehicle body.

A vibration isolating apparatus is known in which an elastic body and a pair of fluid chambers are provided within the vibration isolating apparatus and the fluid chambers are communicated with one another by a restricting passage which is an orifice. When the engine of the vehicle is operated and vibrations are generated, the vibrations are absorbed by the vibration suppressing function of the elastic body and by the viscous resistance or fluid column resonance or the like of the fluid within the orifice which communicates the fluid chambers with one another. The transmission of the vibrations is thereby impeded.

The demand for a reduction in costs by reducing the number of parts or the number of assembly processes and the demand for lighter-weight apparatuses have increased in recent years. Accordingly, the use of resins as materials for the parts of vibration isolating apparatuses has been studied. In a newly-conceived structure resulting from such studies, a mounting member disposed at the outer peripheral side of the elastic body and connected to the vehicle body or to the engine is made of resin, and a conventional metal mounting member is replaced by such a resin bracket or mounting member.

However, in a vibration isolating apparatus having a resin bracket, a cover member for covering the fluid chamber disposed at the inner side of the bracket is needed. Therefore, it is necessary to again study structures and configurations of the cover member.

More specifically, it is necessary to protect a diaphragm, which forms one portion of the inner wall of the fluid chamber and enables deformation of the fluid chamber, and to reliably fix the cover member, which seals the open end of the space for the fluid chamber, to the resin bracket. The means for fixing a cover member, a partitioning member which is disposed within the fluid chamber and divides the fluid chamber in two, or a diaphragm to the bracket may be ultrasonic melt-adhesion or heat melt-adhesion. However, it is difficult to join different types of materials by such melt-adhesion because the cover member and the bracket are formed of respectively different materials, i.e., the cover member is metal and the diaphragm is resin. For example, Japanese Patent Application Laid-Open (JP-A) No. 7-158687 discloses joining a metal cover member to a resin bracket by caulking. However, because the joined portions of the resin bracket creep over time, the joining strength of these portions may gradually deteriorate, and the strength with respect to the fluid pressure of the fluid within the fluid chamber may be insufficient.

SUMMARY OF THE INVENTION

In view of the aforementioned, an object of the present invention is to provide a vibration isolating apparatus which has a resin bracket, and in which the fixing of parts to the bracket and the sealing of a fluid chamber are reliable, and which enables the strength of the fixing and sealing to be maintained.

A first aspect of the present invention is a vibration isolating apparatus comprising: a mounting member connected to one of a vibration generating portion and a vibration receiving portion; an elastic body which is elastically deformable and connected to the mounting member; a bracket which is formed from resin, connected to the other of the vibration generating portion and the vibration receiving portion, connected to the elastic body, and together with the elastic body forms a concave space portion; a fluid chamber which is disposed within the space portion and into which fluid is filled; a caulking metal member disposed such that a portion of the caulking metal member is embedded in the bracket and a portion of one end side of the caulking metal member projects at an open end of the space portion; and a cover member attached to the bracket and covering the fluid chamber so as to close the open end of the space portion, by the portion of the one end side of the caulking metal member being bent and caulked.

Operation of the vibration isolating apparatus relating to the above-described aspect will be described hereinafter.

The resin bracket is connected to the elastic body, which is elastically deformable and connected to the mounting member, so as to form a concave space portion. The fluid chamber in which fluid is filled is provided within the space portion. A portion of the caulking metal member is embedded in the bracket. The portion of the one end side of the caulking metal member projects at the open end of the space portion. By bending and caulking this portion at the one end side of the caulking metal member, the cover member is fixed to the bracket so as to close the open end of the space portion.

Accordingly, in the vibration isolating apparatus formed as described above, when vibrations are transmitted from the vibration generating portion which is connected to the mounting member or to the bracket, the elastic body deforms and the vibrations are damped due to the deformation of the elastic body. As the elastic body deforms, the fluid chamber expands and contracts, the pressure of the fluid varies, and the fluid flows. The vibrations are damped by the viscous resistance and/or the fluid column resonance or the like of the fluid, and it is difficult for the vibrations to be transmitted to the vibration receiving portion.

As described above, because a portion of the caulking metal member is embedded in the bracket, the attachment of the caulking metal and the bracket is strong. The cover member is mounted to the bracket by the bending of the portion of the one end side of the caulking metal member which is strongly attached to the bracket. Therefore, the strength of the attachment of the cover member and the bracket is great.

In a second aspect of the present invention, the vibration isolating apparatus of the first aspect further comprises a metal separating member which separates the bracket and the fluid within the fluid chamber. A portion of the metal separating member forms the caulking metal member. In accordance with this second aspect, because the bracket and the fluid within the fluid chamber are separated by the metal separating member, the bracket does not contact the fluid within the fluid chamber. The metal separating member works as a separating member for separating the bracket and the fluid within the fluid chamber, and works as the caulking metal.

In one embodiment, the bracket includes a substantially cylindrical portion, and the metal separating member is a thin-walled substantially cylindrical body. The axial direction intermediate portion of the substantially cylindrical body includes a projecting portion which projects outwardly and annularly. A portion including the projecting portion of the substantially cylindrical body is disposed at the inner side of the substantially cylindrical portion of the bracket. A portion including the distal end portion of the projecting portion is embedded in the bracket.

In another embodiment, the caulking metal member is a thin-walled substantially cylindrical body. A portion including one axial direction end portion of the substantially cylindrical body is embedded in the bracket. The caulking metal member serves as a stopper for the bracket (i.e., prevents the bracket from coming out or being pulled out) due to the one axial direction end portion of the substantially cylindrical body being bent toward the outer side.

The caulking metal member may be a thin-walled, arc-shaped, metal plate member. In this case, a plurality of metal plate members may be embedded in the bracket at substantially equal intervals along the outer periphery of the cover member.

DESCRIPTION OF THE PREFERRED EMBODIMENTS

Figure 1:
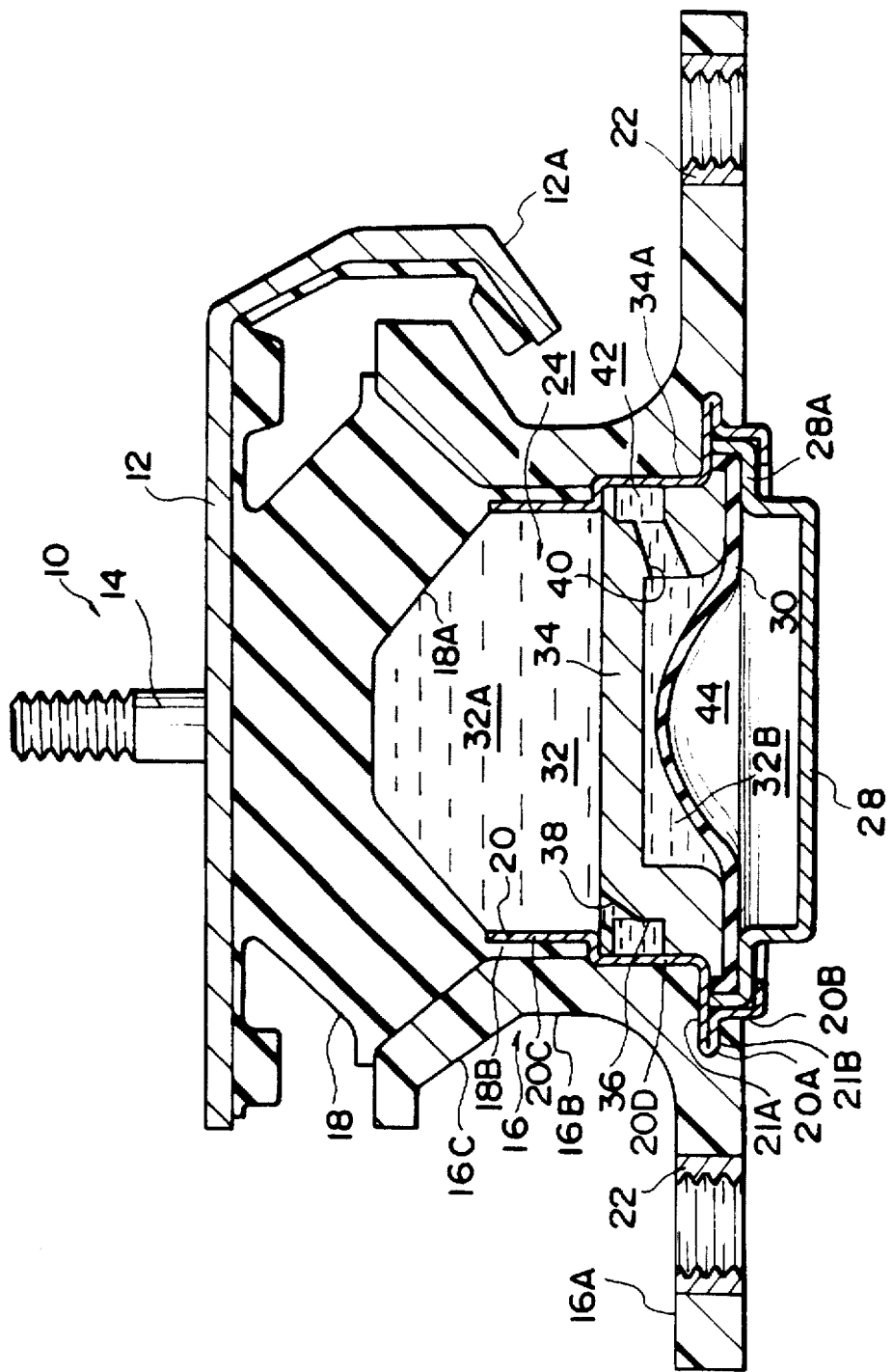
FIG. 1 is a cross-sectional view illustrating a first embodiment of a vibration isolating apparatus relating to the present invention.
Figure 2:
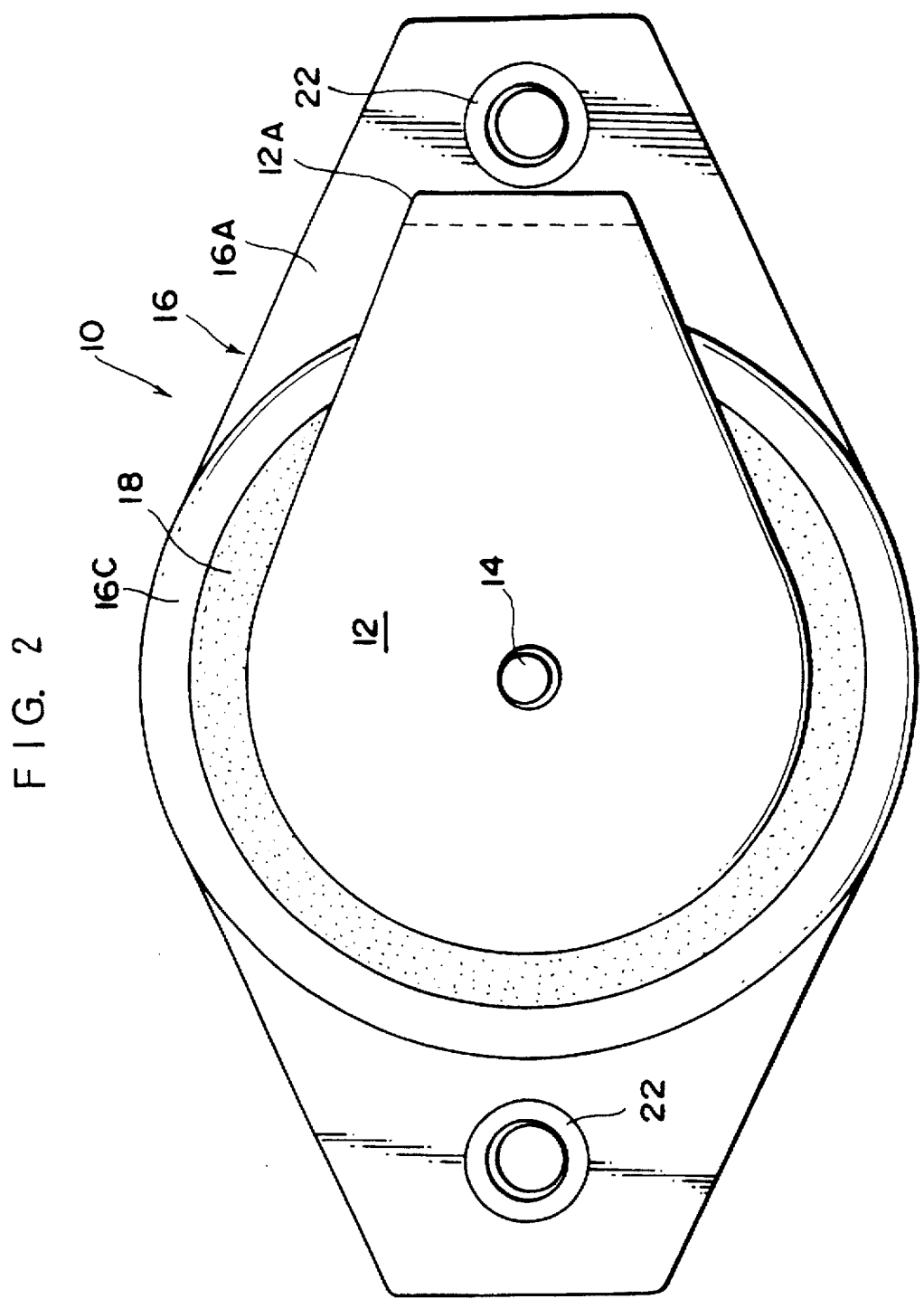
FIG. 2 is a plan view illustrating the first embodiment of the vibration isolating apparatus relating to the present invention.
Figure 3:
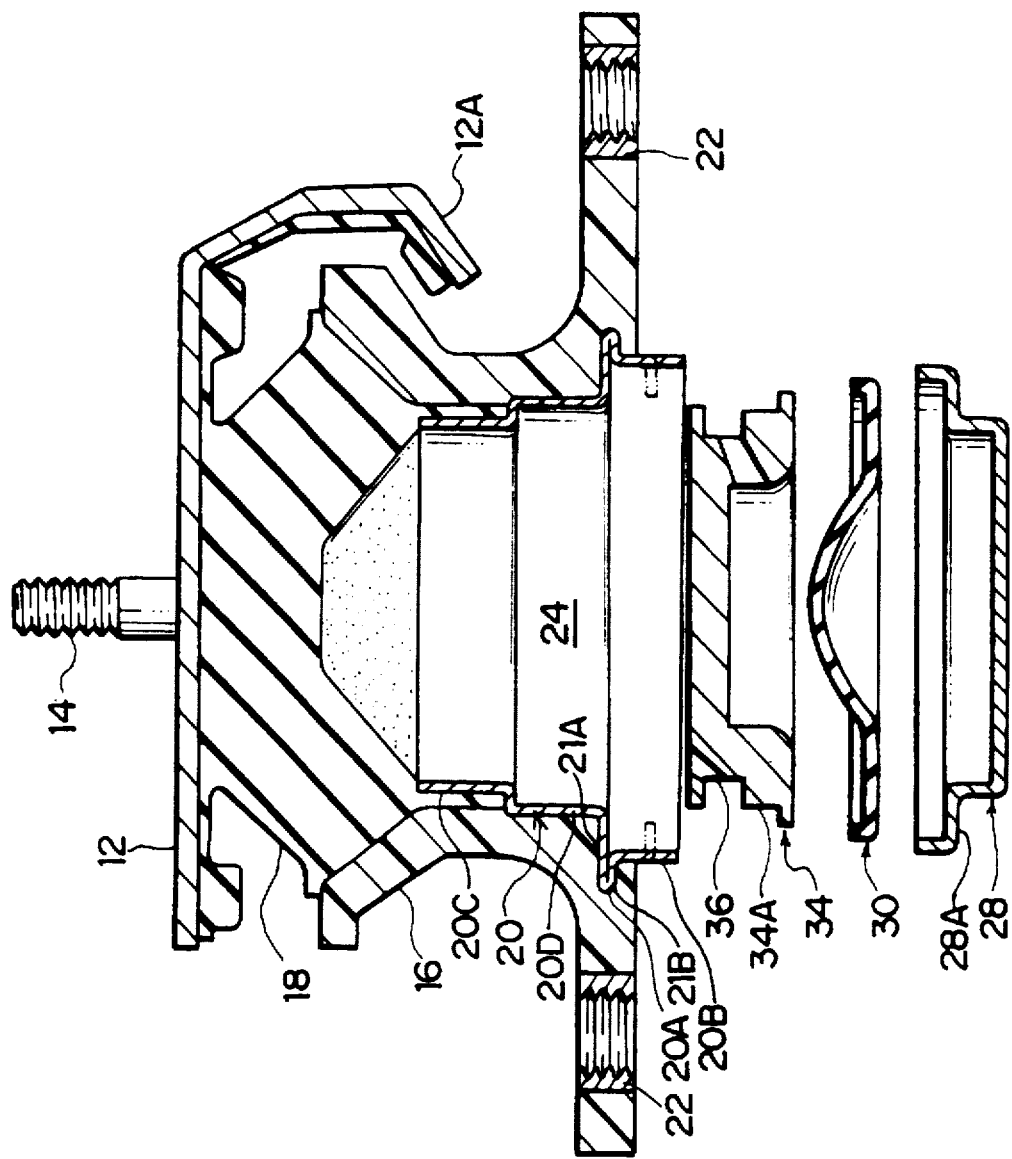
FIG. 3 is a cross-sectional view illustrating assembly of the first embodiment of the vibration isolating apparatus relating to the present invention.

A first embodiment of a vibration isolating apparatus relating to the present invention is illustrated in FIGS. 1 through 3 and is described hereinafter on the basis of these figures.

As illustrated in FIGS. 1 and 2, a bolt 14 projects from the top portion of a top plate 12 which forms the upper portion side of a vibration isolating apparatus 10. The bolt 14 connects and fixes the top plate 12 to an engine (unillustrated) by being screwed with an unillustrated nut. A stopper portion 12A, which is bent downwardly, is formed at one end side of the top plate 12. The top plate 12 and the bolt 14 form a mounting member.

The upper portion of a substantially cylindrical, rubber elastic body 18 is bonded by vulcanization to the top plate 12. The elastic body 18 extends to the one end side of the top plate 12 as well and is also bonded by vulcanization to the stopper portion 12A. A concave portion 18A is provided at the center of the bottom portion of the elastic body 18. A thin-walled cylindrical portion 18B which extends downward is provided at the lower end of the elastic body 18.

A supporting cylinder 16, which is a bracket formed in a cylindrical shape and formed of a synthetic resin, is provided at the lower side of the elastic body 18 so as to surround the cylindrical portion 18B of the elastic body 18.

The lower portion of the supporting cylinder 16 is formed by a flange portion 16A which projects outwardly. A pair of collars 22, in the inner surface of each of which a screw is formed, are embedded in the flange portion 16A. The supporting cylinder 16 is connected to a vehicle body by unillustrated bolts, which project from the vehicle body, being screwed with the collars 22.

A tubular portion 16B rises up orthogonally from the inner peripheral portion of the flange portion 16A. A taper portion 16C, which is formed in a taper shape such that the upper side thereof has a larger diameter, is provided continuously with the top portion of the tubular portion 16B. The stopper portion 12A is disposed so as to oppose the outer peripheral side of the taper portion 16C.

The outer peripheral surface of cylindrical portion 18B of the elastic body 18 is adhered to the inner peripheral surface of the supporting cylinder 16 from the taper portion 16C to the approximately intermediate portion of the tubular portion 16B. The supporting cylinder 16 is in a state of being connected to the elastic body 18 due to this adhesion.

A separating metal 20, which is a substantially cylindrical, thin steel plate, is disposed at the inner peripheral side of the supporting cylinder 16 so as to run along the inner peripheral surface of the supporting cylinder 16. The separating metal 20 includes an upper portion 20C, which has a small diameter and opposes the inner peripheral surface of the cylindrical portion 18B of the elastic body 18, and an intermediate portion 20D, which has a diameter larger than that of the upper portion 20C and opposes the inner peripheral surface of the supporting cylinder 16. A projecting portion 20A which projects outwardly from the bottom end of the intermediate portion 20D is also formed at the separating metal 20. The projecting portion 20A includes a first portion 21A, which is bent outwardly substantially orthogonally from the lower end of the intermediate portion 20D and extends outwardly, and a second portion 21B, which is bent inwardly from the outer end of the first portion 21A. Further, a substantially cylindrical stopper portion 20B, which is bent downwardly from the inner end of the second portion 21B and extends downwardly, is formed at the separating metal 20.

The radial direction length of the first portion 21A is greater than the radial direction length of the second portion 21B. More specifically, the inner end of the second portion 21B is positioned between the outer end and the inner end of the first portion 21A. Accordingly, the diameter of the stopper portion 20B is greater than the diameter of the intermediate portion 20D and smaller than the outer diameter of the projecting portion 20A. Further, the cylindrical portion 18B of the elastic body 18 and the upper portion 20C of the separating metal 20 are connected together by being bonded by vulcanization. During assembly, an adhesive can be placed between these respective portions which can then simply be superposed.

The distal end of the projecting portion 20A of the separating metal 20 is embedded by insert molding into the supporting cylinder 16. As a result, the separating metal 20 is reliably fixed to the supporting cylinder 16.

A space portion 24, which is a concave space, is formed by the cylindrical separating metal 20,which is disposed at the inner peripheral side of the supporting cylinder 16, and the concave portion 18A of the elastic body 18. The space portion 24 is sealed by a rubber diaphragm 30, whose outer peripheral end abuts the lower surface of the first portion 21A of the projecting portion 20A, so as to form a fluid chamber 32 disposed within the space portion 24. A fluid such as water, oil or the like is filled in the fluid chamber 32. As a result, an opening formed at the inner peripheral side of the cylindrical stopper portion 20B is an open end of one axial direction end side of the space portion 24, and the separating metal 20 separates the supporting cylinder 16 and the fluid within the fluid chamber 32.

A partitioning member 34, which is formed from a metal material for example, is disposed in the fluid chamber 32 so as to be fit to the inner peripheral surface of the intermediate portion 20D of the separating metal 20. The partitioning member 34 partitions the fluid chamber 32 into a main fluid chamber 32A and an auxiliary fluid chamber 32B.

The lower end portion of an outer peripheral end portion 34A, which is the outer peripheral surface of the partitioning member 34, projects outwardly, and this projecting portion abuts the bottom surface of the first portion 21A of the projecting portion 20A. Further, the partitioning member 34 and the diaphragm 30 are integrally pushed against and fixed to the bottom surface of the first portion 21A of the projecting portion 20A by a cap 28 which is a cover member which covers the fluid chamber 32.

The cap 28 is disc-shaped and has a flange portion 28A whose outer peripheral end is bent in a ring shape. The cap 28 is disposed at the open end of the space portion 24 such that the outer peripheral end of the flange portion 28A is fit against the inner peripheral surface of the stopper portion 20B. In the state in which the cap 28 is disposed at the open end of the space portion 24, the stopper portion 20B engages the cap 28 and acts as a stopper for the cap 28 due to the distal end side (lower end portion) of the stopper portion 20B being bent inwardly along the entire periphery (i.e., due to the distal end side of the stopper portion 20B being caulked toward the inner side).

Accordingly, in the state in which the cap 28 is engaged with the stopper portion 20B, which is one axial direction end side of the separating metal 20, the cap 28 is attached to the supporting cylinder 16 so as to close the open end of the space portion 24, and the cap 28 covers the fluid chamber 32.

An air chamber 44 is formed between the diaphragm 30 and the cap 28 so as to enable deformation of the diaphragm 30.

A groove portion 36 is formed at the inner side of the outer peripheral end portion 34A of the partitioning member 34 along substantially the entire periphery of the outer peripheral end portion 34A. A small hole 38, which communicates the main fluid chamber 32A and the interior of the groove portion 36, is formed at one end portion of the groove portion 36. A small hole 40, which communicates the auxiliary fluid chamber 32B and the interior of the groove portion 36, is formed at the other end portion of the groove portion 36. Accordingly, the groove portion 36, which is closed by the inner peripheral surface of the separating metal 20, and the small holes 38, 40 form an orifice 42 which communicates the main fluid chamber 32A and the auxiliary fluid chamber 32B.

Next, assembly of the vibration isolating apparatus 10 of the present embodiment will be described.

First, the top plate 12 and the separating metal 20 are placed in a mold for vulcanization (unillustrated), and the elastic body 18 is vulcanized. The elastic body 18 is bonded by vulcanization to the top plate 12 and the separating metal 20.

Next, adhesion processing is carried out at the necessary portions of the elastic body 18 for adhering the supporting cylinder 16. Thereafter, the elastic body 18, which has become integral with the top plate 12 and the separating metal 20, and the collars 22 are placed in a mold for resin molding (unillustrated), and a molten resin material is injection molded. As illustrated in FIG. 3, the supporting cylinder 16 is adhered and connected to the elastic body 18 and the supporting cylinder 16 is insert molded such that the projecting portion 20A of the separating metal 20 is embedded in the supporting cylinder 16.

The partitioning member 34, which divides the fluid chamber 32 in two, is inserted into the fluid from the open end of the space portion 24. Further, the fluid chamber 32 is sealed by the diaphragm 30 which forms a portion of an inner wall of the fluid chamber 32. Finally, the flange portion 28A of the cap 28 is fit against the stopper portion 20B of the separating metal 20, and the stopper portion 20B is caulked so as to be bent inwardly as shown by the two-dot chain line. In this way, the open end of the space portion 24 is closed by the cap 28 and is set in the state illustrated in FIG. 1. More specifically, the partitioning member 34, the diaphragm 30, and the cap 28 are strongly nipped by the stopper portion 20B and the first portion 21A of the projecting portion 20A of the separating metal 20.

Thereafter, the vibration isolating apparatus 10, whose assembly is completed as described above, is installed in a vehicle.

Operation of the present first embodiment will now be described.

When an engine at which the top plate 12 is disposed is operated, the vibrations of the engine are transmitted to the elastic body 18 via the top plate 12. The elastic body 18 acts as a vibration absorbing body, and can absorb the vibrations by a vibration suppressing function based on the internal friction accompanying the deformation of the elastic body 18. Further, due to the deformation of the elastic body 18, the main fluid chamber 32A expands and contracts and the diaphragm 30 at the auxiliary fluid chamber 32B deforms, so that the fluid in the main fluid chamber 32A and the auxiliary fluid chamber 32B flows through the orifice 42. The vibration isolating effect can be improved due to the damping operation based on variations in the pressure of the fluid which occur within the orifice 42 and/or viscous resistance and/or fluid column resonance or the like of the flow of the fluid.

Moreover, when the partitioning member 34 and the diaphragm 30 are placed in the fluid chamber 32, the cap 28 closes the open end of the space portion 24 with the cap 28 engaging the stopper portion 20B which is formed at the lower end side of the separating metal 20. Therefore, the cap 28 can seal the fluid chamber 32 while reliably fixing the partitioning member 34, the diaphragm 30 and the like.

The separating metal 20 separates the supporting cylinder 16 and the fluid within the fluid chamber 32 such that the surface of the supporting cylinder 16 is not exposed to the fluid chamber 32. Therefore, the supporting cylinder 16 does not absorb the fluid within the fluid chamber 32, and the strength of the resin does not deteriorate. Accordingly, the fluid within the fluid chamber 32 is not affected, e.g., is not absorbed or the like. Therefore, the cap 28 can fix the partitioning member 34 and the diaphragm 30 to the interior of the fluid chamber 32 with sufficient strength with respect to fluid pressure of the fluid within the fluid chamber 32 being maintained for a long period of time.

Even if a bracket, i.e., the supporting cylinder 16, formed of polyamide type resin (nylon 6, 66 or the like), which is a representative example of resin materials, is used in the vibration isolating apparatus, in a case in which a surface of the bracket is exposed to the fluid chamber, the fluid in the fluid chamber, e.g., ethylene glycol, may be absorbed, and the strength of the resin may deteriorate. However, in the first embodiment, as described above, the bracket is separated from the fluid in the fluid chamber by the separating metal 20. Therefore, there is no fear that the strength of the resin will deteriorate.

During assembly of the vibration isolating apparatus 10, the supporting cylinder 16 is dampened by the fluid. However, because this is only temporary, the supporting cylinder 16 does not absorb the fluid.

In accordance with the present first embodiment, the lower end portion of the separating metal 20 embedded in the supporting cylinder 16 by insert molding is the stopper portion 20B. Therefore, strength with respect to compression and pulling acting on the stopper portion 20B can be maintained high at the supporting cylinder 16 which is formed of a resin material, and the cap 28 can be fixed even more strongly to the supporting cylinder 16. More specifically, convex and concave portions are formed in the supporting cylinder 16 by the projecting portion 20A such that the strength for preventing the separating metal 20 from being pulled out from the supporting cylinder 16 can be maintained and the strength at the supporting cylinder 16 with respect to the compression and the pulling acting on the separating metal 20 can be maintained.

Further, in the state in which the cap 28 is disposed at the open end of the space portion 24, the stopper portion 20B of the lower end side of the separating metal 20 is bent. Therefore, the cap 28 can easily be fixed to the supporting cylinder 16.

By using the supporting cylinder 16, which is formed of a synthetic resin material and separated from the fluid within the fluid chamber 32, the manufacturing cost of the vibration isolating apparatus 10 can be reduced, and the vibration isolating apparatus 10 can be made more light-weight.

When vibrations of an extremely large amplitude in the transverse direction are generated, the stopper portion 12A of the top plate 12 abuts the taper portion 16C of the supporting cylinder 16 so that excessive deformation of the elastic body 18 is prevented.

Next, a second embodiment of the vibration isolating apparatus relating to the present invention will be described on the basis of FIG. 4. Members which are the same as those of the first embodiment are denoted by the same reference numerals, and description thereof is omitted.

Figure 4:
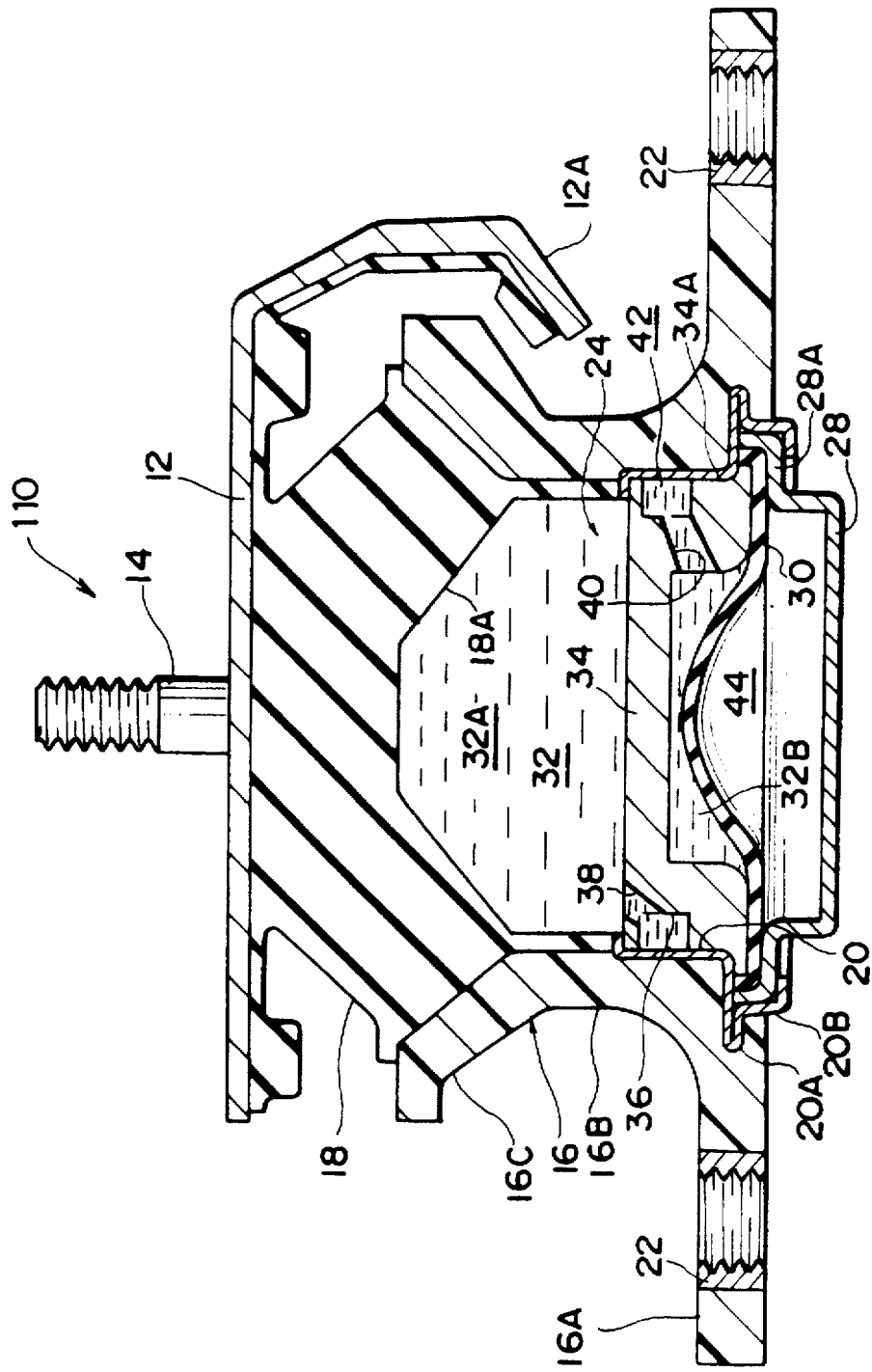
FIG. 4 is a cross-sectional view illustrating a second embodiment of a vibration isolating apparatus relating to the present invention.

As illustrated in FIG. 4, in a vibration isolating apparatus 110 of the second embodiment, although a separating metal 120 is disposed along the inner peripheral surface of the supporting cylinder 16, the separating metal 120 is shorter than the separating metal 20 of the first embodiment. More specifically, the separating metal 120 does not include the upper portion 20C which the separating metal 20 of the first embodiment has. Accordingly, the second embodiment differs from the first embodiment in that, in the second embodiment, the upper end portion of the separating metal 120 and the lower end edge of the cylindrical portion 18B of the elastic body 18 are bonded together by vulcanization. The separating metal 120 does not cover the inner peripheral surface of the cylindrical portion 18B of the elastic body 18. In this case, the concave space portion 24 is formed by the separating metal 120 and by a concave portion 18A and the cylindrical portion 18B of the elastic body 18. In this way, the length of the separating metal 120 is made shorter, and the assemblability of the vibration isolating apparatus 110 improves.

Other examples of the resin used for the supporting cylinder 16 besides polyamide resin are polyacetal, polycarbonate, and polyimide resin materials. However, the resin material used for the supporting cylinder 16 is not limited to the above examples.

In the above-described embodiments, the fluid is filled into the fluid chamber 32 after the supporting cylinder 16 is insert molded. However, instead of the above-described order of assembly processes, assembly may be carried out in the following order. The fluid chamber 32 is formed in advance by the elastic body 18, the separating metal 20, the diaphragm 30 and the like, and fluid is filled in the fluid chamber 32. The cap 28 is engaged, and finally, the supporting cylinder 16 is insert molded.

In the above-described embodiments, the top plate 12, which is the mounting member, is connected to the engine, which is the vibration generating portion. The supporting cylinder 16, which is the bracket made of resin, is connected to the vehicle body of a vehicle such as an automobile, which vehicle body is the vibration receiving portion. However, the opposite structure can also be employed.

Moreover, isolating vibrations of an engine installed in a vehicle is the object of the above-described embodiments. However, the vibration isolating apparatus of the present invention may be used, for example, in a body mount or the like of a vehicle or may be used for purposes other than vehicles. Further, the configurations, dimensions and the like are not limited to those of the above-described embodiments.

Accordingly, the vibration isolating apparatuses of the first and second embodiments have brackets formed of resin which, due to the above-described structures, make the fixing and the sealing of parts reliable and allow the strength thereof to be maintained.

A third embodiment of the vibration isolating apparatus relating to the present invention will be described hereinafter with reference to FIGS. 5 through 7.

Figure 5:
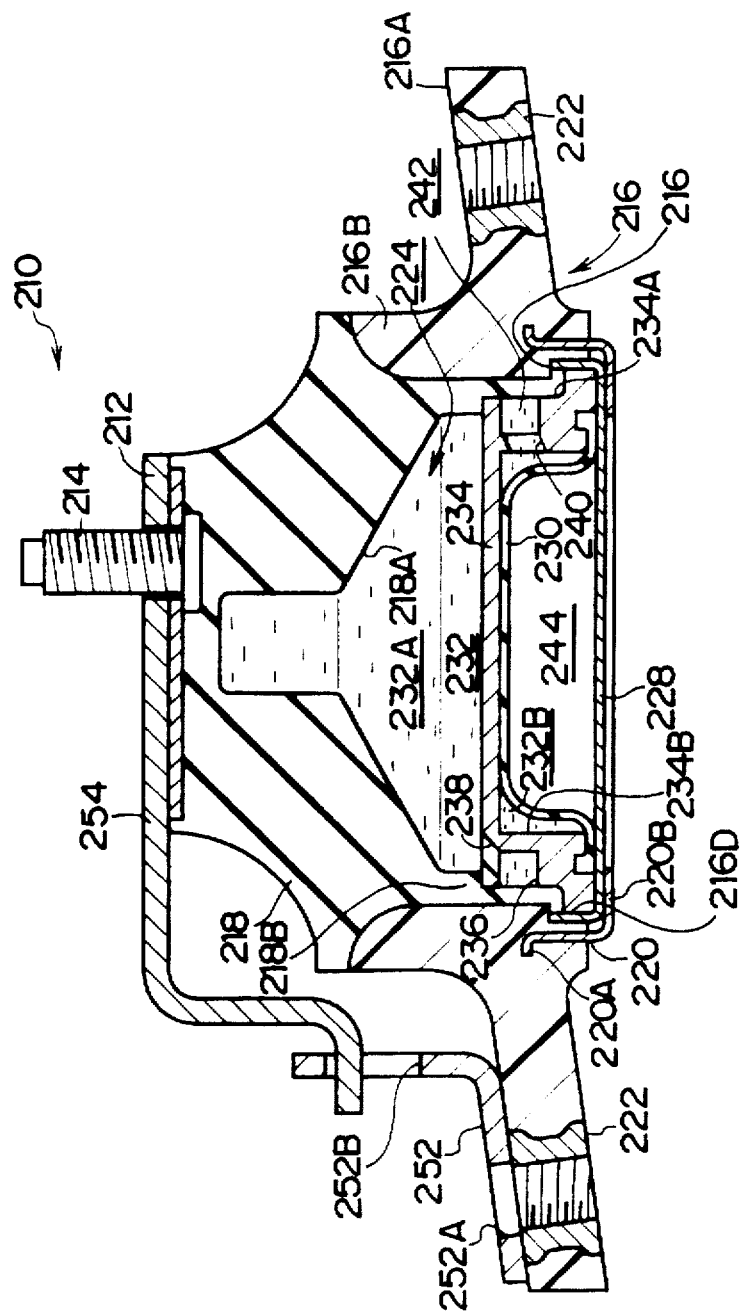
FIG. 5 is a cross-sectional view illustrating a vibration isolating apparatus relating to a third embodiment of the present invention.

FIG. 5 illustrates a vibration isolating apparatus 210 relating to the third embodiment. As shown in FIG. 5, a bolt 214 projects from the top portion of a top plate 212 which forms the upper portion side of the vibration isolating apparatus 210. The bolt 214 connects and fixes the top plate 212 to an engine (unillustrated) by being screwed with an unilllustrated nut. The top plate 212 and the bolt 214 form a mounting member.

The top portion of a cylindrical, rubber elastic body 218 is bonded by vulcanization to the top plate 212. A concave portion 218A, whose central portion in particular is deeply hollowed, is provided in the center of the bottom portion of the elastic body 218. A thin-walled cylindrical portion 218B which extends downward is provided at the lower end of the elastic body 218.

At the lower side of the elastic body 218, a supporting cylinder 216, which is a bracket formed in a cylindrical shape from a synthetic resin material, is disposed so as to surround the lower portion of the elastic body 218. The lower portion of the supporting cylinder 216 is formed by a flange portion 216A which projects outwardly. A pair of collars 222, which are stud nuts, are embedded in the flange portion 216A. The supporting cylinder 216 is connected to a vehicle body by unillustrated bolts, which project from the vehicle body, being screwed with the collars 222.

A tubular portion 216B rises upward orthogonally from the inner peripheral portion of the flange portion 216A. The outer peripheral surface of the elastic body 218 is adhered to the portion of the supporting cylinder 216 from the upper portion of the tubular portion 216B to the inner peripheral surface near the lower portion of the tubular portion 216B. Due to this adhesion, the supporting cylinder 216 is connected to the elastic body 218. The inner peripheral surface of the lower portion of the tubular portion 216B is formed, via a step portion 216C, as an increased-diameter portion 16D whose diameter is increased slightly.

A concave space portion 224 is formed by the concave portion 218A and the cylindrical portion 218B of the elastic body 218 disposed at the inner peripheral side of the supporting cylinder 216. A partitioning member 234 is formed from, for example, a metal material, and the lower end portion of an outer peripheral end portion 234A, which is the outer peripheral surface of the partitioning member 234, projects outwardly. The partitioning member 234 is disposed in the space portion 224 with the partitioning member 234 fit to the inner peripheral surface of the concave portion 218A and with the lower end portion of the outer peripheral end portion 234A abutting the lower end portion of the elastic body 218. As a result, the partitioning member 234, together with the concave portion 218A of the elastic body 218, defines the space which is the main fluid chamber 232A.

A concave portion 234B, which is hollowed in a circular form, is formed in the center of the bottom portion side of the partitioning member 234. The concave portion 234B is sealed by a rubber diaphragm 230, whose outer peripheral end abuts the lower surface of the partitioning member 234, such that an auxiliary fluid chamber 232B is formed at the center of the bottom portion side of the partitioning member 234. A fluid chamber 232 is formed by the main fluid chamber 232A and the auxiliary fluid chamber 232B, and fluid is filled into the main fluid chamber 232A and the auxiliary fluid chamber 232B.

The partitioning member 234, which partitions the fluid chamber 232 into the fluid chambers 232A, 232B which are a plurality of small fluid chambers, and the diaphragm 230, which forms an elastically deformable separating wall of the auxiliary fluid chamber 232B among the plurality of small fluid chambers, and the like are fluid chamber forming members which together with the elastic body 218 form the fluid chamber 232.

A cap 228, which serves as a cover member and which is disc-shaped and whose outer peripheral end is bent in a ring-shape, is disposed at the open end of the space portion 224 such that the outer peripheral end of the cap 228 is fit against the increased-diameter portion 216C of the supporting cylinder 16. The partitioning member 234 and the diaphragm 230 are integrally pushed toward the upper portion side of the vibration isolating apparatus 210 and fixed by the cap 228 which is disposed at the open end of the space portion 224 and covers the fluid chamber 232.

A metal fixing member 220, which is an insert member formed by a thin steel plate being made into a cylindrical shape, is disposed at the lower surface side of the supporting cylinder 216. The upper side portion forming the proximal end side of the fixing member 220 is insert molded and embedded into the supporting cylinder 216 so as to run along the inner peripheral surface of the supporting cylinder 216. Thus, the supporting cylinder 216 and the fixing member 220 are connected to each other. In order to increase the insert strength with respect to the supporting cylinder 216, a flange portion 220A, which is bent toward the outer peripheral side of the fixing member 220, is formed at the upper side portion of the fixing member 220.

Accordingly, the fixing member 220 is reliably fixed to the supporting cylinder 216. Further, the lower side portion forming the distal end side of the fixing member 220 is a stopper portion 220B which is bent toward the inner peripheral side.

More specifically, in the state in which the partitioning member 234 and the diaphragm 230 are disposed within the space portion 224 and the cap 228 is disposed at the open end of the space portion 224, by bending the distal end side of the stopper portion 220B of the fixing member 220 along the entire periphery thereof and projecting the distal end side of the stopper portion 220B in the direction of the inner periphery, the stopper portion 220B of the fixing member 220 engages with the cap 228 so as to act as a stopper for the partitioning member 234, the diaphragm 230 and the cap 228 (i.e., so as to prevent the partitioning member 234, the diaphragm 230 and the cap 228 from coming out or being pulled out). An air chamber 244 is formed between the diaphragm 230 and the cap 228 and allows deformation of the diaphragm 230.

A groove portion 236 is formed at the inner side of the outer peripheral end portion 234A of the partitioning member 234 along substantially the entire periphery of the outer peripheral end portion 234A. A small hole 238, which communicates the main fluid chamber 232A and the interior of the groove portion 236, is formed at one end portion of the groove portion 236. A small hole 240, which communicates the auxiliary fluid chamber 232B and the interior of the groove portion 236, is formed at the other end portion of the groove portion 236. Accordingly, the groove portion 236, which is closed by the inner peripheral surface of the cylindrical portion 218B, and the small holes 238, 240 form an orifice 242 which communicates the main fluid chamber 232A and the auxiliary fluid chamber 232B.

The proximal end side of a stopper member 252 is disposed on the flange portion 216A of the supporting cylinder 216. A through hole 252A is formed in a position of the proximal end side of the stopper member 252 so as to be coaxial with one of the collars 222, and a bolt is passed through the through hole 252A. The distal end side of the stopper member 252 is bent and extends upwardly in FIG. 5. An engagement hole 252B is formed approximately in the vertical direction central portion of the distal end side. An engaging body 254, which is structured such that a portion near the distal end side thereof is bent and inserted loosely into the engagement hole 252B of the stopper member 252, is disposed at the top portion of the top plate 212.

Therefore, even in a case in which vibrations of a extremely large amplitude are inputted to the vibration isolating apparatus 210, the engaging body 254 abuts the inner wall surface of the engagement hole 252B of the stopper member 252 such that the amount of deformation of the elastic body 218 is limited to a prescribed range.

Next, assembly of the vibration isolating apparatus 210 of the third embodiment will be described.

First, the top plate 212 and the bolt 214 are manufactured, and are placed in a mold for vulcanization (unillustrated). The elastic body 218 is vulcanized, and as illustrated in FIG. 6A, is bonded by vulcanization to the top plate 212 and the bolt 214.

Adhesion processing, such as application of adhesive, is effected at the necessary places of the elastic body 218 in order to adhere the supporting cylinder 216. Thereafter, the elastic body 218, which has been made integral with the top plate 212 due to the bonding by vulcanization, and the fixing member 220 and the collars 222, which serve as the insertion metal, are placed in a mold for resin molding (unillustrated), and a molten resin material is injection molded.

Figure 6B:
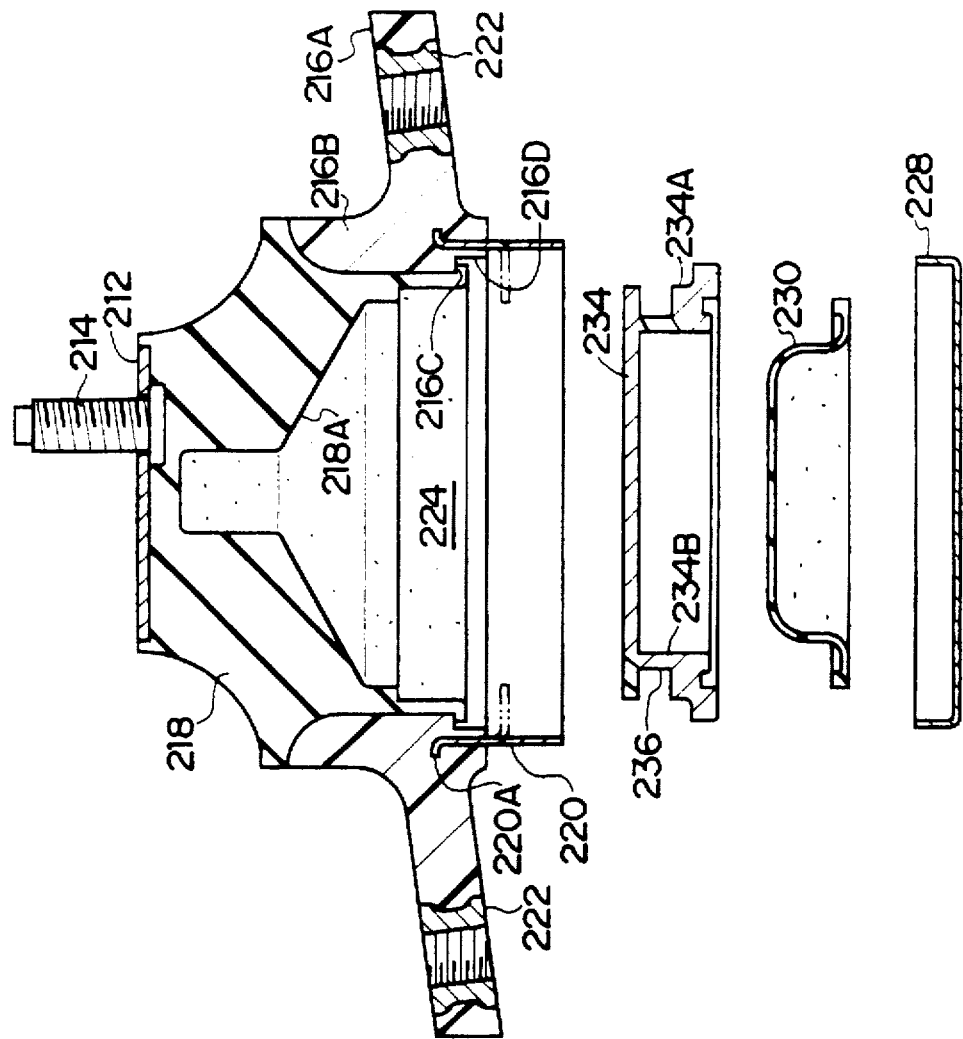
FIG. 6B is a view for explaining assembly of the vibration isolating apparatus relating to the third embodiment of the present invention, and is a cross-sectional view illustrating a state in which a supporting cylinder is adhered to the elastic body.
Figure 6A:
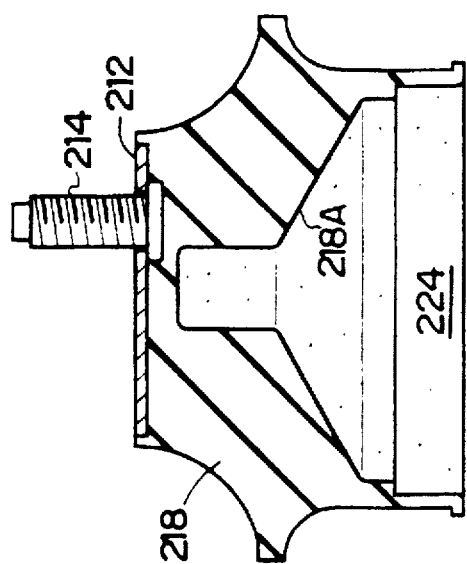
FIG. 6A is a view for explaining assembly of the vibration isolating apparatus relating to the third embodiment of the present invention, and is a cross-sectional view illustrating a state in which an elastic body is vulcanized.

As a result, as illustrated in FIG. 6B, the supporting cylinder 216 is adhered and connected to the elastic body 218, and the proximal end side of the fixing member 220 and the collars 222 are embedded in the supporting cylinder 216. The resin supporting cylinder 216 is insert molded so as to become integral with the elastic body 218, the fixing member 220 and the collars 222.

The cap 228, the diaphragm 230, the partitioning member 234 and the like are manufactured separately. The partitioning member 234, which divides the fluid chamber 232 in two is inserted into the fluid from the open end of the space portion 224. The fluid chamber 232 is sealed by the diaphragm 230 which forms a portion of the separating wall of the fluid chamber 232.

Figure 7:
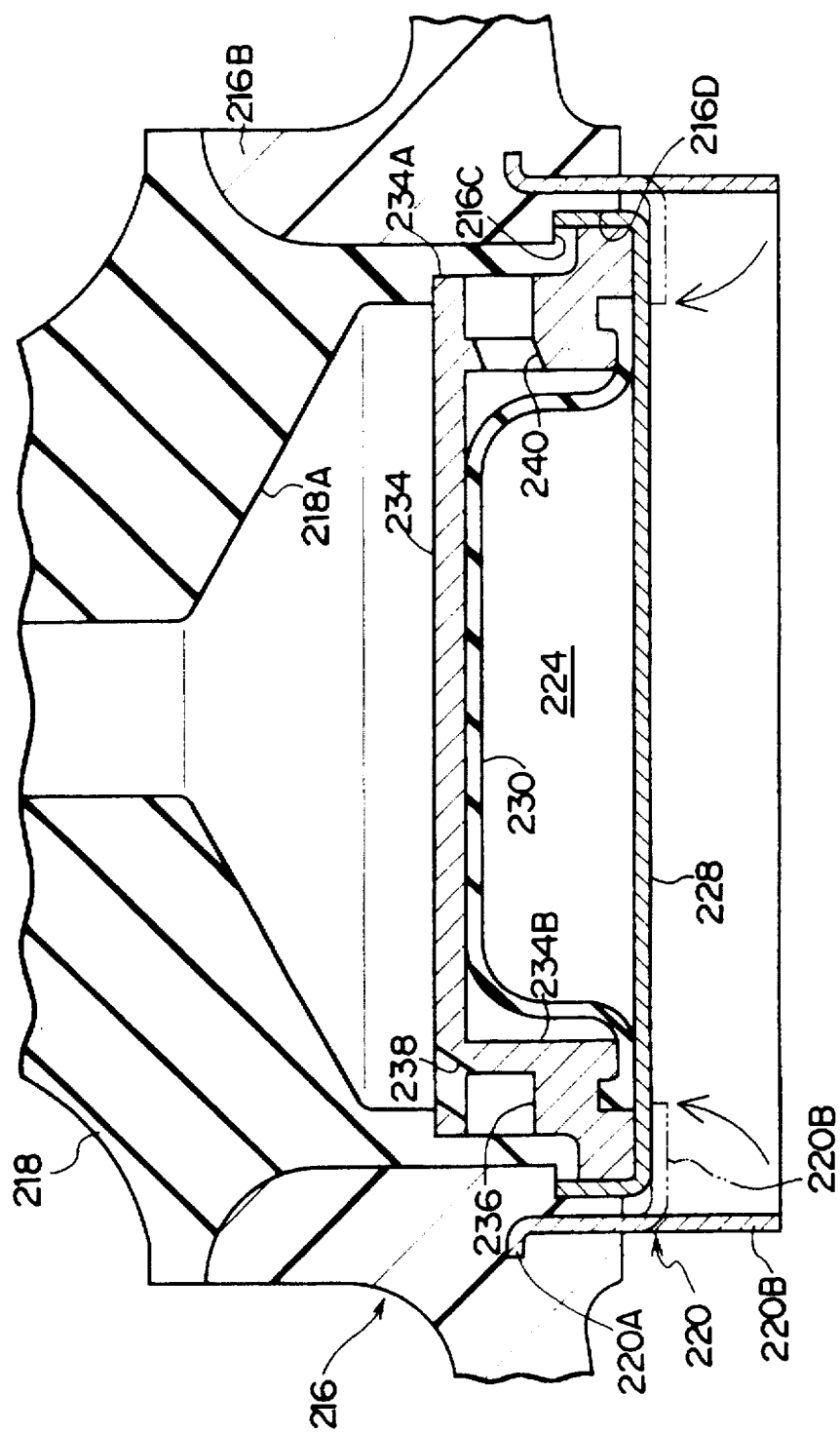
FIG. 7 is an enlarged cross-sectional view of main portions, for explaining assembly of the vibration isolating apparatus relating to the third embodiment of the present invention.

Finally, the cap 228 is fit to the inner peripheral surface of the supporting cylinder 216, and the stopper portion 220B of the fixing member 220 is caulked so as to be bent inwardly as shown by the two-dot chain line in FIG. 7. In this way, the open end of the space portion 224 is closed by the cap 228, and the fluid is sealed within the fluid chamber 232 as illustrated in FIG. 5. Namely, the cap 228 which is the cover member is nipped between the supporting cylinder 216 and the stopper portion 220B of the fixing member 220. However, assembly does not have to be carried out in the fluid as described above, and the fluid may be injected into the fluid chamber 232 afterwards.

Thereafter, the stopper member 252 and the engaging body 254 are attached, and the vibration isolating apparatus 210 for which assembly is completed is installed in a vehicle.

Next, operation of the vibration isolating apparatus 210 relating to the present third embodiment will be described.

When the engine at which the top plate 212 is disposed is operated, the vibrations of the engine are transmitted to the elastic body 218 via the top plate 212. The elastic body 218 works as a vibration absorbing body, and can absorb vibrations due to the vibration suppressing function based on the internal friction accompanying the deformation of the elastic body 218. Due to the deformation of the elastic body 218, the main fluid chamber 232A expands and contracts, and the diaphragm 230 at the auxiliary fluid chamber 232B deforms. The fluid in the main fluid chamber 232A and the auxiliary fluid chamber 232B flows through the orifice 242. The vibration isolating effect can be improved due to the damping operation based on variations in the pressure of the fluid which occur within the orifice 242 and/or on viscous resistance and/or fluid column resonance or the like of the flow of the fluid.

The proximal end side of the fixing member 220 is embedded in the supporting cylinder 216, and the distal end side of the fixing member 220 is caulked. The diaphragm 230 and the partitioning member 234, which together with the elastic body 218 form the fluid chamber 232 in which the fluid is sealed, are thereby fixed to the cap 228.

Accordingly, the fixing member 220 is embedded in the supporting cylinder 216, and the partitioning member 234 and the diaphragm 230 are fixed by the fixing member 220. Therefore, as compared to a case in which the fixing member is melt-adhered, the strength of the connection is increased, and accordingly, the reliability of the connection increases. The partitioning member 234 and the diaphragm 230 can be fixed reliably. Further, as compared to a case in which an insertion metal is embedded in the elastic body 218, there is no need to adhere the fixing member 220. Therefore, the manufacturing cost is decreased by the extent that an adhesion process is no longer needed.

When the partitioning member 234 and the diaphragm 230 are disposed in the fluid chamber 232, in the state in which the cap 228 is engaged with the stopper portion 220B formed at the lower end side of the fixing member 220, the open end of the space portion 224 is closed. Therefore, the fluid chamber 232 can be sealed with the cap 228 reliably fixing the partitioning member 234 and the diaphragm 230.

As described above, by using the supporting cylinder 216 formed of a synthetic resin material, the manufacturing cost of the vibration isolating apparatus 210 can be reduced and the vibration isolating apparatus 210 can be made more light-weight.

In the present third embodiment, the fluid chamber forming members are the partitioning member 234 and the diaphragm 230. The distal end side of the fixing member 220 is bent and caulked so that the partitioning member 234 and the diaphragm 230 are fixed. Accordingly, the partitioning member 234 and the diaphragm 230 are reliably fixed by the fixing member 220. However, the partitioning member 234 and the diaphragm 230 can be reliably fixed in a similar manner even if another member is inserted in the fluid chamber 232.

The flange portion 220A is provided at the proximal end side of the fixing member 220, and a portion of or the entire outer periphery of the proximal end side of the fixing member 220 is a flange structure. Therefore, inadvertent pulling out of the fixing member 220 can be prevented, and pulling out of the fixing member 220 at the time the stopper portion 220B is caulked can be prevented.

Next, a fourth embodiment of the vibration isolating apparatus relating to the present invention will be described on the basis of FIG. 8. Members which are the same as those of the first embodiment are denoted by the same reference numerals, and description thereof is omitted.

Figure 8:
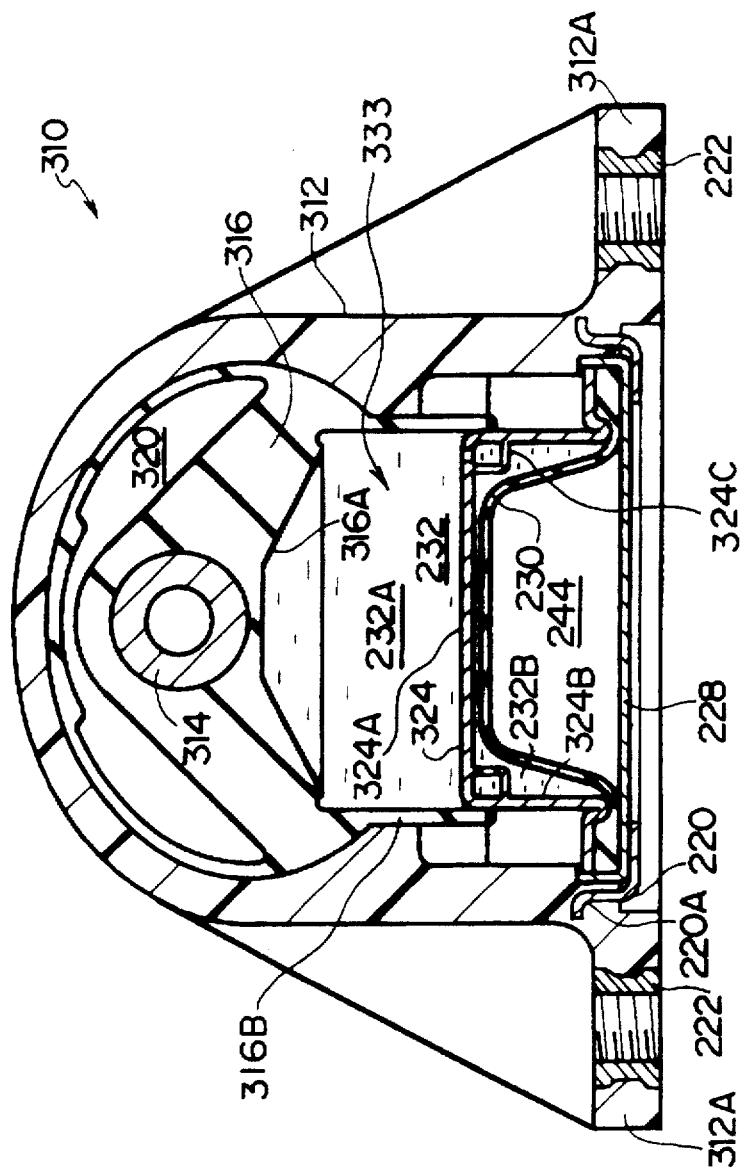
FIG. 8 is a cross-sectional view illustrating a vibration isolating apparatus relating to a fourth embodiment of the present invention.

As illustrated in FIG. 8, a vibration isolating apparatus 310 of the fourth embodiment includes an outer-tube-integral-type bracket 312 which has an elliptical hole portion and is formed integrally of a synthetic resin. Arms 312A for connecting the bracket 312 by screws to an unillustrated vehicle body of a vehicle, which vehicle body is a vibration receiving portion, project at either side of the vibration isolating apparatus 310. A collar 222 is embedded in and fixed to each arm 312A. Accordingly, the bracket 312 is connected to the vehicle body by the pair of collars 222.

An inner tubular metal 314, which is formed as a circular tube and is a mounting member, is disposed at the inner side of the bracket 312 so as to be parallel to the axis of the bracket 312. By screwing an unillustrated bolt into the inner tubular metal 314, the inner tubular metal 314 and an unillustrated engine, which is a vibration generating portion, are connected.

A rubber elastic body 316 is disposed between the inner tubular metal 314 and the bracket 312. The elastic body 316 is formed as an elliptical column and is bonded by vulcanization to the outer peripheral surface of the inner tubular metal 314. A concave portion 316A is formed beneath the inner tubular metal 314 in the axial direction intermediate portion of the elastic body 316. A rectangular tubular portion 316B extends from the bottom portion of the elastic body 316. Accordingly, a space portion 333 is formed by the concave portion 316A and the rectangular tubular portion 316B. A through hole 320, which is circular-arc-shaped in cross-section and which penetrates through in the axial direction, is provided at the side of the inner tubular metal 314 opposite the side at which the concave portion 316A is provided. The inner tubular metal 314 deforms easily in the vertical direction which is the main vibrating direction of the vibration isolating apparatus 310.

In the present embodiment, a partitioning member 324, which is rectangular when viewed from above and conforms to the rectangular configuration of the space portion 333, is used. The partitioning member 324 includes a substantially rectangular bottom wall 324A and four side walls 324B, so as to be formed like a box having a bottom. The partitioning member 324 is fit with the rectangular tubular portion 316B of the elastic body 316 such that the bottom wall 324A is disposed at the upper side. Accordingly, the main fluid chamber 232A is formed by the concave portion 316A and the rectangular tubular portion 316B of the elastic body 316 and by the bottom wall 324A of the partitioning member 324. The bottom end portions (distal end portions) of the side walls 324B of the partitioning member 324 are bent outwardly.

The inner side of the partitioning member 324 is sealed by a substantially rectangular diaphragm 230 whose outer peripheral end abuts the bottom surfaces of the side walls 324A of the partitioning member 324. The auxiliary fluid chamber 232B is thereby formed at the inner side of the partitioning member 324.

The partitioning member 324, which partitions the fluid chamber 232 into the fluid chambers 232A, 232B which are a plurality of small fluid chambers, and the diaphragm 230, which forms an elastically deformable separating wall of the auxiliary fluid chamber 232B among the plurality of small fluid chambers, and the like are fluid chamber forming members which together with the elastic body 316 form the fluid chamber 232. The main fluid chamber 232A and the auxiliary fluid chamber 232B are communicated by an orifice 324C provided in the partitioning member 324.

A cap 228, which is substantially rectangular in plan view and whose edge portion is formed as a ring-shaped wall, is disposed at the lower side of the diaphragm 230. At the lower surface side of the bracket 312, a substantially rectangular fixing member 220 is insert molded and embedded in the bracket 312 so as to run along the substantially rectangular inner peripheral surface of the bracket 312. The bracket 312 and the fixing member 220 are connected to each other.

The vibration isolating apparatus 310 relating to the present fourth embodiment has the same operation as that of the vibration isolating apparatus 210 of the third embodiment. Further, because the bracket 312 is formed integrally of a resin material, there is no need for working such as press working or the like of the bracket and the outer tube.

Therefore, the working processes are simplified even more, and the manufacturing cost is reduced even more.

In the previously-described third embodiment, the top plate 212 which is the mounting member is connected to the engine which is the vibration generating portion. The supporting cylinder 216 which is the resin bracket is connected to the vehicle body of a vehicle such as an automobile, which vehicle body is the vibration receiving portion. However, the opposite structure is also possible. Further, in the fourth embodiment, the inner tubular metal 314 is connected to the engine which is the vibration generating portion, and the bracket 312 is connected to the vehicle body which is the vibration receiving portion. However, the opposite structure is also possible.

In the above-described third and fourth embodiments, resin materials such as polyamide resin, ABS, polyacetal, polycarbonate, polyamide and the like are considered for the resin material used for the supporting cylinder 216 and the bracket 312. However, the resin material used in the present invention is not limited to these materials.

Figure 9:
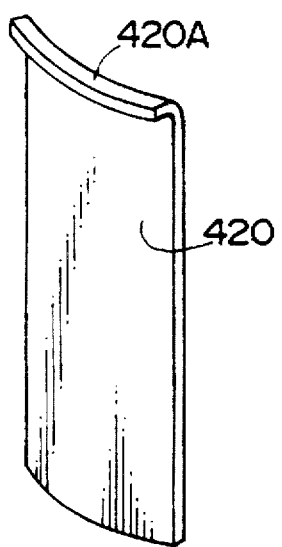
FIG. 9 is a perspective view of a variant example of an insert member.

In the third embodiment, the insert member, which is a cylindrical, thin, steel plate, is used as the fixing member 220 which fixes the cap 228 which serves as the cover member. However, the insert member which can be used in the present invention is not limited to the member used in the third embodiment. For example, as illustrated in FIG. 9, a substantially rectangular body 420, which is a thin steel plate, may be insert molded at the bottom surface of the supporting cylinder 216. In this case, a portion of a bent portion 420A, which is one longitudinal direction end portion of the substantially rectangular body 420, is embedded in the supporting cylinder 216 in the same way as in the third embodiment. Further, it is preferable that a plurality of substantially rectangular bodies 420, e.g., three or four substantially rectangular bodies 420, are disposed at even intervals along the inner peripheral surface of the supporting cylinder 216.

As explained above, in the third and fourth embodiments, the fluid chamber forming members are fixed by the insert member or the metal which works as a fixing member and which is partially embedded in the bracket. Therefore, as compared with a case in which the fixing member for fixing the fluid chamber forming members is directly fixed by caulking to the bracket, the embedding/joining strength of the bracket and the insert member is greater than the caulking/joining strength of the fixing member and the bracket, and the partitioning member and the diaphragm and the like can be fixed to the bracket even more reliably. Further, the fixing member may be embedded in the elastic body as an insertion metal. However, in this case, the insertion metal must be adhered, and a drawback arises in that the manufacturing cost increases as an adhesion process must be provided. However, in the third and fourth embodiments, there is no need to provide such a processing step.

In this way, the vibration isolating apparatuses of the third and fourth embodiments exhibit the effect that the fluid chamber forming members which form the fluid chamber can be reliably fixed with the manufacturing cost of the vibration isolating apparatus being reduced.

Isolating vibrations of an engine installed in a vehicle such as an automobile is the object of the above-described embodiments. However, the vibration isolating apparatus of the present invention may be used, for example, as a body mount of a vehicle or may be used for purposes other than vehicles. Further, the configurations, dimensions and the like of the bracket, the elastic body and the like are not limited to those of the above-described embodiments.

What is claimed is:

1. A vibration isolating apparatus comprising:
   a mounting member capable of being connected to one of a vibration generating portion and a vibration receiving portion;
   an elastic body which is elastically deformable and connected to said mounting member;
   a bracket which is formed from resin, which is capable of being connected to the other of the vibration generating portion and the vibration receiving portion, which is connected to said elastic body, and which together with said elastic body forms a concave space portion;
   a fluid chamber which is disposed within the space portion for receiving fluid therein;
   a caulking metal member disposed such that a portion of said caulking metal member is embedded in said bracket and a portion of one end of said caulking metal member projects away from said bracket at an open end of the space portion; and
   a cover member that closes the space portion by being attached to said bracket by the portion of the one end of said caulking metal member that projects away from said bracket being bent and caulked to said cover member.

2. The vibration isolating apparatus according to claim 1, further comprising:
   a metal separating member for separating said bracket and the fluid within said fluid chamber,
   wherein a portion of said metal member separating member forms said caulking metal.

3. The vibration isolating apparatus according to claim 2, wherein said bracket includes a substantially cylindrical portion, and said metal separating member is a substantially cylindrical body, said substantially cylindrical body including an intermediate portion which projects outwardly and annularly with respect to the central longitudinal axis of said substantially cylindrical body, wherein said intermediate portion is disposed at an inner side of said substantially cylindrical portion and includes at least one projecting portion having a distal end embedded in the substantially cylindrical portion.

4. The vibration isolating apparatus according to claim 3, wherein said projecting portion includes a first portion, which is bent outwardly with respect to the central longitudinal axis of said substantially cylindrical body, and a second portion, which is bent back inwardly from a distal end portion of said first portion.

5. The vibration isolating apparatus according to claim 4, wherein an inner end of said second portion is positioned at a position between the distal end portion of said first portion and an inner end portion of said first portion with respect to the central longitudinal axis of said substantially cylindrical body.

6. The vibration isolating apparatus according to claim 5, wherein a cylindrical portion extends from an inner end portion of said second portion and said cover member is nipped between said cylindrical portion and a portion of said first portion which is further inward than the inner end of said second portion.

7. The vibration isolating apparatus according to claim 5, further comprising:
   a partitioning plate which divides said fluid chamber into two chambers and provides communication between the two chambers via an orifice; and
   a diaphragm which seals said fluid chamber,
   wherein said partitioning plate and said diaphragm are nipped between said cover member and a portion of said first portion which is further inward than the inner end of said second portion.

8. The vibration isolating apparatus according to claim 3, wherein said substantially cylindrical portion of said bracket includes a first inner diameter portion and a second inner diameter portion which is larger than said first inner diameter portion, said first inner diameter portion and said second inner diameter portion are connected via a step portion, and said cover member is nipped between said step portion and the portion of the one end of said caulking metal member.

9. The vibration isolating apparatus according to claim 8, further comprising:
   a partitioning plate which divides said fluid chamber into two chambers and provides communication between the two chambers via an orifice; and
   a diaphragm which seals said fluid chamber,
   wherein said partitioning plate and said diaphragm are nipped by said cover member and said step portion.

10. The vibration isolating apparatus according to claim 3, wherein said elastic body includes a cylindrical portion which extends toward said substantially cylindrical body, and a distal end edge of said cylindrical portion of said elastic body is adhered to said substantially cylindrical body.

11. The vibration isolating apparatus according to claim 3, wherein said elastic body includes a cylindrical portion which extends along an outer surface of said substantially cylindrical body, and said cylindrical portion of said elastic body is surface-adhered to the outer surface of said substantially cylindrical body.

12. The vibration isolating apparatus according to claim 1, wherein a distal end portion of another end of said caulking metal member is bent in a direction substantially opposite to a direction in which the portion of the one end of said caulking metal member is bent and caulked.

13. The vibration isolating apparatus according to claim 1, wherein the portion of said caulking metal member embedded in said bracket comprises another end of said caulking metal member.

14. The vibration isolating apparatus according to claim 1, wherein a portion of said elastic body and a portion of said metal separating member are adhered together.

15. The vibration isolating apparatus according to claim 1, wherein said caulking metal member is a substantially cylindrical body.

16. The vibration isolating apparatus according to claim 1, wherein said caulking metal member is a plate-shaped member, and a plurality of plate-shaped members are provided along an outer periphery of said cover member.

* * * * *